(12) United States Patent
Celli et al.

(10) Patent No.: US 7,474,745 B1
(45) Date of Patent: Jan. 6, 2009

(54) SYSTEM AND METHOD TO HANDLE PHONE LINE SERVICES DURING MODEM DIAL-UP CONNECTION

(75) Inventors: Massimiliano Celli, Latina (IT); Luigi Pichetti, Rome (IT); Marcello Velati, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,724

(22) Filed: Apr. 24, 2008

(51) Int. Cl.
*H04M 11/00* (2006.01)
*H04M 3/42* (2006.01)

(52) U.S. Cl. .................. 379/215.01; 379/93.35; 379/207.05; 379/211.01; 379/373.01

(58) Field of Classification Search .......... 379/93.01, 379/93.35, 201.01, 201.02, 201.07, 201.1, 379/206.01, 207.04, 207.05, 207.14, 209.01, 379/210.02, 211.02, 213.01, 215.01, 221.01, 379/211.01, 372, 373.01, 373.03; 370/352
See application file for complete search history.

(56) References Cited

U.S. PATENT DOCUMENTS

| | | | | |
|---|---|---|---|---|
| 5,809,128 A * | 9/1998 | McMullin | ............... | 379/215.01 |
| 6,285,680 B1 * | 9/2001 | Steinka et al. | ............... | 370/431 |
| 6,438,222 B1 * | 8/2002 | Burg | .................. | 379/215.01 |
| 6,567,854 B1 * | 5/2003 | Olshansky et al. | ........... | 709/229 |
| 6,665,388 B2 * | 12/2003 | Bedingfield | ............. | 379/142.01 |
| 6,775,370 B2 * | 8/2004 | Burg | .................... | 379/215.01 |
| 6,816,481 B1 * | 11/2004 | Adams et al. | ............... | 370/352 |
| 7,054,428 B1 | 5/2006 | Berthoud et al. | | |
| 7,203,293 B1 * | 4/2007 | Bedingfield | ............. | 379/142.01 |
| 7,317,714 B2 | 1/2008 | Roberts et al. | | |
| 2007/0206750 A1 * | 9/2007 | Bedingfield | ............. | 379/142.01 |
| 2007/0268892 A1 * | 11/2007 | Adams et al. | ............... | 370/352 |

* cited by examiner

*Primary Examiner*—Binh K Tieu
(74) *Attorney, Agent, or Firm*—Leveque IP Law, P.C.

(57) ABSTRACT

A method and system provides for notification of a called party of an incoming voice phone call intended for the called party even while the called party is engaged in data communications via a dial-up modem. In response to a calling party placing a call, a telecommunications network determining whether the called number is busy. If the called number is busy, the telecommunications network determines whether the called number is engaged in data communications. If the called number is engaged in data communications, the telecommunications network further: determines a data communication protocol being used by the called party to access the data network via a modem device, retrieves from a user profile of the called party one or more user notification addresses associated with the data communication protocol, and transmits an incoming call notification message to the one or more user notification addresses of the called party. A reporting notification message is further transmitted by the telecommunications network to the calling party to let the calling party know that the called party has been notified of the incoming call.

1 Claim, 2 Drawing Sheets

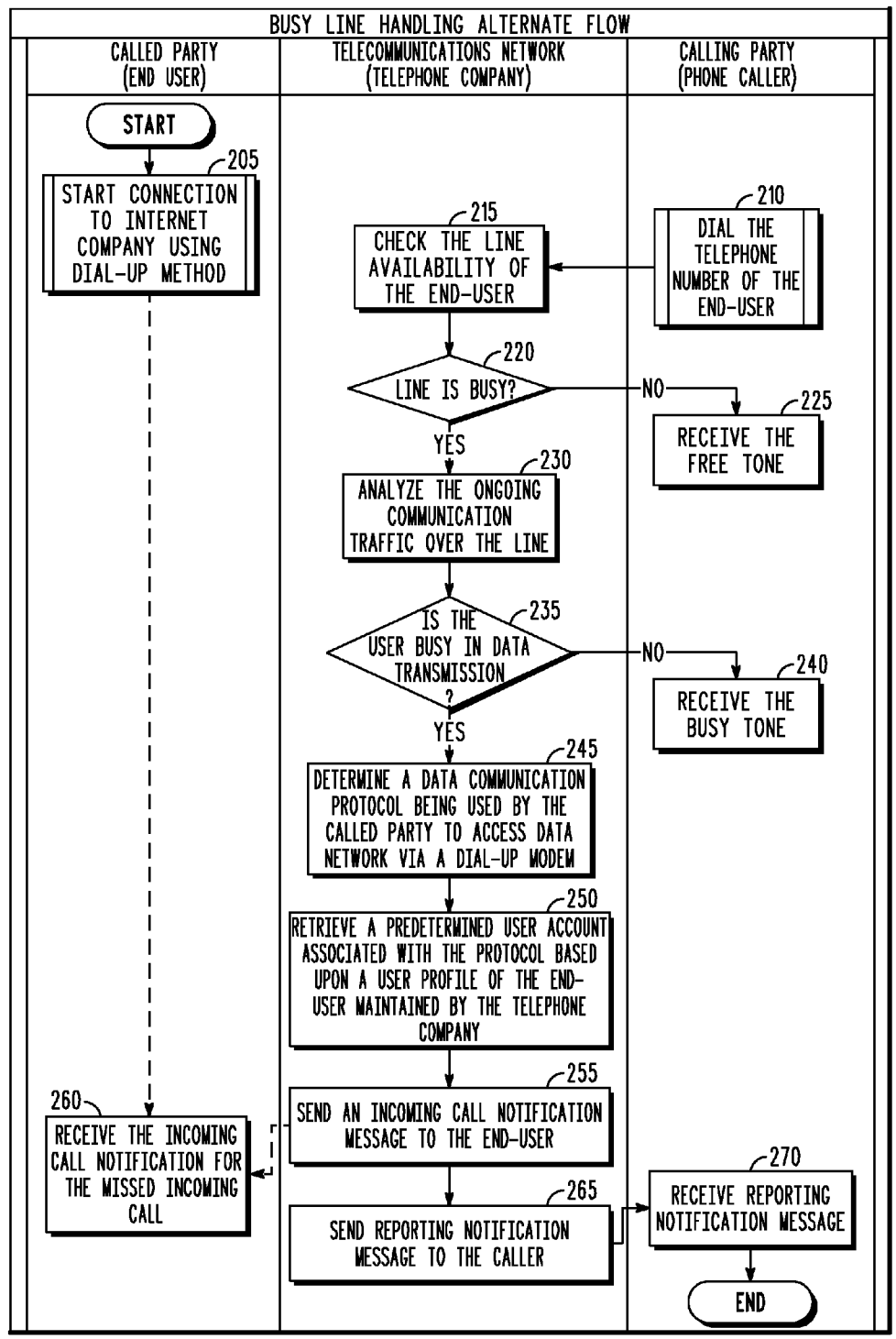
FIG. 2    200

SYSTEM AND METHOD TO HANDLE PHONE LINE SERVICES DURING MODEM DIAL-UP CONNECTION

BACKGROUND

While there are a variety of technologies that may be used to connect a user to the Internet, many of which provide faster connection rates and better communication bandwidth than dial-up modems can provide as a connection mechanism, there are still those who use dial-up modem technology for connectivity. Many people do not have better connection options available to them, such as Asymmetric Digital Subscriber Line (ADSL), or they cannot afford the higher cost associated with them.

Almost all households and businesses, however, are still supplied with at least one telephone connection provided by a telecommunications network. Both incoming and outgoing calls are handled by a telephone company with whom the customer contracts to provide a well established set of services in accordance with a standard service level agreement (SLA). When modem users wish to connect their personal computer (PC) or computer to the Internet, they must usually dial a well-known telephone number to reach an Internet Service Provider (ISP) server through which connection to the Internet may be made. During data communications via the modem, the telephone company will be unable to route an incoming call to the user because the phone line will be busy due to the data communications traffic being received over the phone line.

In the case of ordinary voice conversation, the user is alerted to an incoming telephone call in the form of a pre-recorded operator voice message or special tone that alerts the user of a pending incoming call. This, however, is not available when the user has his telephone line busy with data traffic through a PC modem. The PC modem, moreover, is not able to interpret any voice message, nor is the user able to detect it, as the modem has exclusive control over the phone line.

BRIEF SUMMARY

In accordance with embodiments consistent with the present invention, a method and system provides user notification of incoming calls received during on-going data communications. In response to a calling party placing a call from a calling number to a called number of a called party, a telecommunications network determining whether the called number is busy. If the called number is busy, the telecommunications network determines whether the called number is engaged in data communications by analyzing traffic on the communications line being used by the called number. If the called number is engaged in data communications, the telecommunications network further: determines a data communication protocol being used by the called party to access the data network via a modem device, retrieves from a user profile of the called party one or more user notification addresses associated with the data communication protocol being used by the called party, and transmits an incoming call notification message to the one or more user notification addresses of the called party. A reporting notification message is further transmitted by the telecommunications network to the calling party to let the calling party know that the called party has been notified of the incoming call.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 2 is a flow chart that illustrates an exemplary flow in accordance with various embodiments disclosed herein.

DETAILED DESCRIPTION

Figure 1:
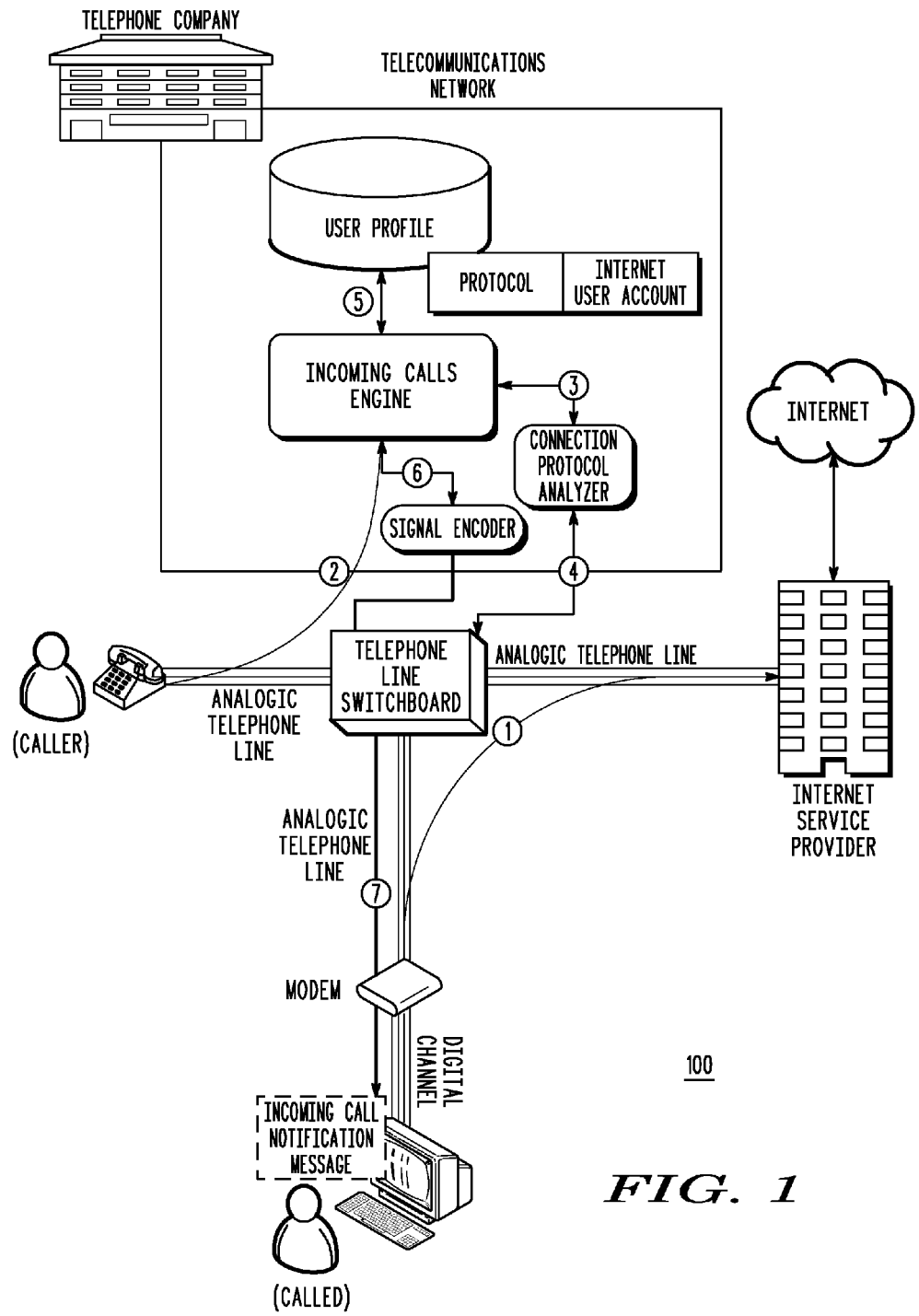
FIG. 1 is a system block diagram, in accordance with certain embodiments.

In accordance with embodiments consistent with the present invention, a method and system described herein provides for notification of a called party of an incoming voice phone call intended for the called party even while the called party is engaged in data communications via a dial-up modem.

Referring now to FIG. 1, system diagram 100 illustrates exemplary system components in accordance with various embodiments. A person wishes to access data communications, such as to the Internet as shown in this example, by using a dial-up modem connected to his computer as shown. The dial up model utilizes the user's telephone line to establish a data communications channel or line. This is referenced by reference numeral 1. For purposes of this diagram, the person accessing the Internet using the modem is referenced as Called, or End User.

While thus engaged in data communications over his analog telephone line, Called will not be able to receive regular phone calls over the call number associated with his telephone and anyone calling Called's telephone number will receive a busy signal. This is illustrated by reference number 2. Caller makes a telephone call over his analog telephone line. The telephone call is routed to the telecommunications network where it is received by an Incoming Calls Engine as shown. The telecommunications network utilizes the Connection Protocol Analyzer to understand wether the called phone number is busy as referenced by reference number 3. In order to give such a response, Connection Protocol Analyzer interacts with the Telephone Line Switchboard as illustrated by reference number 4. By means of Telephone Line Switchboard, Connection Protocol Analyzer is also able to determine the data communication protocol that is being used by the Called to access a data network, such as the Internet, via the modem device. For instance, Connection Protocol Analyzer can determine whether Called is using a POPO3 protocol, indicative of email; a communication port XXXX, perhaps indicative of a chat messaging protocol provided by message provider X, etc.

Once the Incoming Calls Engine knows the data communication protocol being used by Called, it further can access the User Profile of Called to retrieve one or more user notification addresses associated with the particular data communication protocol being used. The User Profile contains stored information about the various telephone users, including Called. Telephone Companies store personal information about their users to build a profile specific to each user. Such information may be used to provide existing and additional services to customers. As an example, telephone companies may store the street address of any customer to send them monthly payment invoices directly to their home. The email address of a user may be stored as well, allowing registered users, for example, to be notified when a monthly billing report is available for download over the Internet.

Stored user profile information may also include one or more user notification addresses for each user. A notification address is the address at which a user can specify he is to be contacted in the event that the telecommunications network needs to provide him with notification that an incoming call has been received while he is unavailable to receive an incoming phone call over his telephone line, i.e. due to be being connected to the Internet, for instance, or otherwise engaged in data communications via his dial-up or analog modem. A user notification address may be the same email address used for billing notification, for example, a different email address, or some other kind of address, such as an AOL instant messenger account, or some combination of various addresses.

A user may specify various notification addresses for each data communication protocol he might use and may rank by priority notification addresses. Thus, a user may specify one or more email addresses to be used to notify him of an incoming call in the event that he is using the POP3 protocol, one or more user names if he is engaged in a chat message protocol, etc. All of these are examples of user notification addresses that might be stored in a user's profile. By way of example, User Profile store may employ a translation table detailing user notification addresses associated with each communication protocol that the user might use. Each user notification address is appropriate to the type of data communications protocol being used by a user; this allows the user to be notified most quickly in the event of an incoming telephone call. Further, while a user may specify which notification addresses are to be used, and in what order of priority, notification addresses may be gleaned by the telephone company from existing or obtained user records and user information.

Incoming Calls Engine is able to provide an incoming call notification message to Telephone Line Switchboard after going through a signal encoder; this is shown by reference number 6. Telephone Line Switchboard then relays the incoming call notification message to the user notification account gleaned from Called's User Profile, as shown by reference number 7.

Referring now to FIG. 2, flow diagram 200 illustrates the flow for handling telephone busy lines during on-going data communications. The flow is shown between three entities: Called Party (End User), Telecommunications Network (Telephone Company), and Calling Party (Phone Caller). Called Party establishes a data communications connection to the Internet using his dial-up modem, at Block 205. At Block 210, Calling Party dials the telephone number of Called Party (End User). In response to Calling Party placing a call from his calling number to the called number associated with the Called Party, the telecommunications network determines whether the called number is busy. Thus, the telecommunications network checks availability of the called number's line at Block 215. At Decision Block 220, the inquiry is whether Called Party's line is busy. If no, then the Calling Party receives a free tone (ringing tone) at Block 225.

If the called number is busy, at Block 230 the telecommunications network monitors or analyzes the on-going communication traffic over Called's telephone line. At Decision Block 235, the inquiry is whether the ongoing communication traffic thus analyzed is data communication transmission. This is done because the called number may simply be busy engaged in regular, analog voice conversation. Such is the case at Block 240, where a busy tone is simply returned to the Calling Party. If, however, the called number is engaged in data communications, the flow continues to Block 245. The telecommunications network determines a data communication protocol being used by Called Party to access the data network via Called Party's dial-up modem. As previously mentioned, the on-going data communication protocol could be a POP3 protocol in the case of email; or use of a certain communication port to support instant messaging or other communication protocols.

Next, at Block 250, the telecommunications network retrieves from a user profile of Called Party one or more user notification addresses associated with the data communication protocol being used by Called Party. As discussed, any number of user notification addresses may be stored for Called Party in a user profile of Called Party for the particular data communication protocol being used. A translation table in the user profile may be employed to aid look-up of notification address(es) for Called Party if desired. At any rate, the user profile is accessible by the telecommunications network and may additionally be maintained by the telephone company. At Block 255, an incoming call notification message is transmitted by the telecommunications network to the one or more user notification addresses of Called Party; at Block 260, this incoming call notification message is received by Called Party. Next, at Blocks 265 and 270, the telecommunications network transmits a reporting notification message to the calling party that the incoming call notification message has been transmitted to the called party.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of providing user notification of incoming calls received during on-going data communications, comprising:

in response to a calling party placing a call from a calling number to a called number of a called party, a telecommunications network determining whether the called number is busy;

if the called number is busy, the telecommunications network further:

determining whether the called number is engaged in data communications by analyzing traffic on the communications line being used by the called number;

if the called number is engaged in data communications, further comprising:

the telecommunications network determining a data communication protocol being used by the called party to access the data network via a modem device;

the telecommunications network retrieving from a user profile of the called party one or more user notification addresses associated with the data communication protocol being used by the called party;

the telecommunications network transmitting an incoming call notification message to the one or more user notification addresses of the called party; and the telecommunications network transmitting a reporting notification message to the calling party that the incoming call notification message has been transmitted to the called party; and if the called number is not engaged in data communications, the telecommunications network returning a busy indicator to the calling party.

\* \* \* \* \*